US012799748B2

(12) United States Patent
Newman

(10) Patent No.: US 12,799,748 B2
(45) Date of Patent: Nov. 17, 2026

(54) SURFACE FINISH APPLICATOR

(71) Applicant: Carol Newman, Spring Valley, CA (US)

(72) Inventor: Carol Newman, Spring Valley, CA (US)

( * ) Notice: Subject to any disclaimer, the term of this patent is extended or adjusted under 35 U.S.C. 154(b) by 453 days.

(21) Appl. No.: 17/942,688

(22) Filed: Sep. 12, 2022

(65) Prior Publication Data

US 2024/0011307 A1 Jan. 11, 2024

Related U.S. Application Data

(60) Provisional application No. 63/358,915, filed on Jul. 7, 2022.

(51) Int. Cl.

| | |
|---|---|
| ***E04F 21/165*** | (2006.01) |
| ***B05C 1/00*** | (2006.01) |
| ***B05C 1/06*** | (2006.01) |
| ***B05C 11/02*** | (2006.01) |

(52) U.S. Cl.

CPC .......... *E04F 21/1655* (2013.01); *B05C 1/006* (2013.01); *B05C 1/06* (2013.01); *B05C 11/028* (2013.01); *E04F 21/1652* (2013.01)

(58) Field of Classification Search

CPC .............. E04F 21/1655; E04F 21/1652; B05C 17/005; B05C 17/00503; B05C 17/00516

USPC ........................................................ 15/235.7

See application file for complete search history.

(56) References Cited

U.S. PATENT DOCUMENTS

| | | | | |
|---|---|---|---|---|
| 5,792,489 | A * | 8/1998 | Liberman | E04F 21/1655 425/458 |
| 2007/0061989 | A1 * | 3/2007 | Kalbach | E04F 21/241 15/235.4 |
| 2007/0206985 | A1 * | 9/2007 | Daigle | B05C 17/00516 401/266 |
| 2014/0294480 | A1 * | 10/2014 | Gill | E04F 21/1655 401/9 |

* cited by examiner

*Primary Examiner* — Andrew A Horton

(74) *Attorney, Agent, or Firm* — Brennan, Manna & Diamond, LLC

(57) ABSTRACT

The present invention relates generally to the field of wall and surface repair tools. The device has an angled member or plate with a housing mounted on the angled member. The housing has one push tab or plunger, an interior space, and a grip area. The interior space, angled member, and a continuous opening are in fluid communication and allow for the finishing material, such as spackle, to flow through the device and onto the damaged wall or surface.

11 Claims, 4 Drawing Sheets

SURFACE FINISH APPLICATOR

CROSS-REFERENCE TO RELATED APPLICATION

The present application claims priority to, and the benefit of, U.S. Provisional Application No. 63/358,915, which was filed on Jul. 7, 2022, and is incorporated herein by reference in its entirety.

FIELD OF THE INVENTION

The present invention relates generally to the field of home repair and do-it-yourself type tools. More specifically, the present invention relates to an application tool that can be used to apply spackle, caulk, sealant, texturing or finishing compounds and other materials. The tool has a body, with at least one push tab, at least one interior space, and at least one grip or gripping area. The invention further includes at least one angled member, which has at least one edge, at least one fastener, and at least one continuous opening. The interior space, angled member, and continuous openings are in fluid communication and allow for the spackle to flow through the device and onto the damaged wall or other surface being repaired. The spackle is further pushed through the interior space and out of the openings via the push tab or plunger which is positioned on the top of the body, angled member, or plate. When a user pushes the push tab or plunger into the interior space, the spackle is pushed or expelled through the angled member and onto the wall or surface. The applicator provides a novel and convenient way to fix damaged wall corners and other surfaces without requiring the use multiple tools or vast skill in repairing damaged wall corners and other surfaces. Accordingly, the present disclosure makes specific reference thereto. Nonetheless, it is to be appreciated that aspects of the present invention are also equally applicable to other like applications, devices, and methods of manufacture.

BACKGROUND

Many individuals, such as homeowners and construction and maintenance personnel, deal with the inconvenience of scuffed and dented walls. The corners of walls often show more wear than other portions of a wall or surfaces due to damage caused by traffic moving around the corner. Individuals often struggle with home improvement repairs and end up paying for expensive repairmen to fix their dented and scuffed walls as they may not have achieved a smooth finish when making the repairs themselves. Traditional spackle application takes multiple tools, such as one or more putty knives or other blades to smooth the spackle once applied to the surface and it can take a certain amount of skill set to complete the job in an acceptable manner. Repairmen who have the knowledge to repair these damaged walls, still must use multiple tools and spend a lot of time on the project. Dented and scuffed wall corners are often eyesores for the homeowners, building management, and maintenance personnel and often are left unfixed due to the large amount of time and money it takes to fix them.

Therefore, there exists a long-felt need in the art for a surface finishing application device that can be used to fix dented and scuffed walls and other surfaces as well as to apply textures and other finishes with minimal effort. There exists a long-felt need in the art for a device or applicator tool that provides a way for laymen and workers alike, to easily fix damaged walls and other surfaces and to apply textures and other finishes. There exists a long-felt need in the art for a surface finishing application tool or applicator that eliminates the need for multiple tools to fix dents and scuffs in the corners of walls or to create other surface topographies by applying different compounds to the walls. Further, there exists a long-felt need in the art for a spackle applicator tool that eliminates the need to have experience or the skill to fix damaged wall corners or apply other finishing textures. There also exists a long-felt need in the art for a spackle applicator that can fix both rounded and angled edges and other surfaces.

The subject matter disclosed and claimed herein, in one embodiment thereof, comprises a spackle application device. The device has an angled member or plate, with one or more side panels with at least one push tab or plunger contained within a housing mounted on top of the angled member or plate, at least one interior space, and at least one grip or handle. The housing forms a reservoir or chamber to hold a supply of spackle or other material such as caulk, and the angled member or side panels are in fluid communication via at least one continuous opening and chamber or reservoir. The interior space further houses the spackle or other material, and the push tab or plunger forces the spackle or other material through the interior space and out the continuous openings in the panels. The spackle or other material, is further placed into the interior space via a cap. The user removes the cap and fills the interior space, reservoir or chamber with the spackle, texturing compounds, or other material such as caulk or sealants.

The device has an angled member which has two side panels which may be of equal size or different sizes. The side panels may extend from a center line which divides the angled member into first and second portions. The applicator includes at least one edge and at least one continuous opening. In one embodiment, the edges of the angled member are constructed in a 90-degree angle, so as to form a flush fit with sharp wall corners that are 90 degrees. In another embodiment, the edges of the angled member are rounded, in that they are flush with rounded wall corners. In a still further embodiment, the side panels, or first and second portions, are adjustable about the center line so that they can be adjusted to accommodate corners which are not true right angles.

In this manner, the surface finishing application device or tool of the present invention accomplishes all of the foregoing objectives and provides a novel device that can be used to fix damaged walls, other surfaces or to apply textures or other finishes by applying spackle, caulk, sealants, texturing or finishing materials or combinations thereof with minimal effort. Further, it provides individuals with a tool that can apply spackle and other materials to any wall or surface without the need for multiple tools or extensive skill in order to create a finished surface.

SUMMARY OF INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a spackle or other material or compound application device. The device has a housing with at least one push top or plunger element, and at least one interior space, cavity, receptacle, or chamber. The device further at least one angled member, base, or plate and at least one continuous opening. The angled member or panel is movable about a central line to allow the tool to be used in connection with walls or surfaces which are at different angles and may be adjusted to create an angle from 1 degree to 179 degrees and more preferably from between 30 degrees and 150 degrees.

The device is comprised of a housing. In the preferred embodiment, the housing may have a cylindrical shape. The housing is disposed generally along the center line of the body and may be positioned on the top surface of the angled member, plate, or base; or can be closer to one edge or the other. The housing further includes at least one grip area or handle. The grip area or handle is located on the housing and may be any grip area or handle such as, but not limited to, a textured area, or a contoured area to fit to the user's hand. The grip area or handle provides the user with a more comfortable and secure grip or handle of the device while it is in use.

The housing includes an interior space that houses the spackle, finishing compound, or other material. The interior space further includes at least one cap or closure provided over the interior space. The cap or closure provides a user with the means to fill the interior space with the material to be used in the finishing or repair of the surface. The housing includes a push top or plunger that is positioned on the top of the housing. The push top or plunger allows a user to push down on the push top or plunger pushing the spackle, compound, or other finishing material through the interior space and through the continuous opening. In one embodiment, the tool has a dial that can be operated to make the continuous opening wider or narrower to customize the amount of material that is applied to the wall or surface.

The applicator tool further includes at least one angled member connected at a central point and preferably two angled members or panels extending from the central or connecting point. The applicator tool has a top surface, a bottom surface, a top edge, bottom edge, side edges, and at least one continuous opening. The one or more openings may be provided around the central or connecting point of the angled members or panels so that the material can spread out from the central point. In one embodiment, the angled member's edges are sharp in that the angled member is angled at a 90-degree angle to be flush with the edges of standard walls. In differing a embodiment, the edge may be any shape that allows a user to accommodate the different edges of walls or angles in the surfaces to be finished. In one embodiment, the edge of the angled member is rounded. This rounded edge allows for the device to be used on wall corners that are rounded instead of angled. This allows the spackle or other finishing material application device to be used on a plurality of types of wall edges and other surfaces. In one embodiment, the angled member or panel is interchangeable with the housing. This allows a user to change out the angled member for a plurality of wall shapes and sizes. In this embodiment, the angled member or plate and housing are attached via reciprocating fasteners or hinges allowing the angled member, or the first and second members or panels, to be moved with respect to the central or connecting point.

The angled member has at least one continuous opening positioned on the bottom surface. The housing and the angled member are further in fluid communication and allow the spackle or other material to be applied to the damaged wall or surface through the continuous openings to be finished. The device may further include a leveling member, or one or more guides, positioned on the angled member. The leveling member allows a user to know that the device is flush against the wall and promotes uniform spackle application. The guides may be set to a particular height so that a certain thickness of material is applied to the surface.

In one embodiment, the angled member is fixed to the body. In another embodiment, the angled member is interchangeable with the body. In another embodiment, the angled member is movable about a central point to create angles ranging from between 1 degree to 179 degrees. In the interchangeable embodiment, the angled members may be attached to the housing via at least one fastener. The fasteners allow a user to be able to change the angled member to fit any corner of any wall. The fasteners located on the angled member attach to the reciprocating fasteners positioned on the housing for easy customization.

Accordingly, the spackle application device of the present invention is particularly advantageous as it provides users with a means to repair damaged walls or to apply finishing textures and create unique topographical surfaces on a wall or surface with minimal effort. In this manner, the surface finishing application device overcomes the limitations of existing tools known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
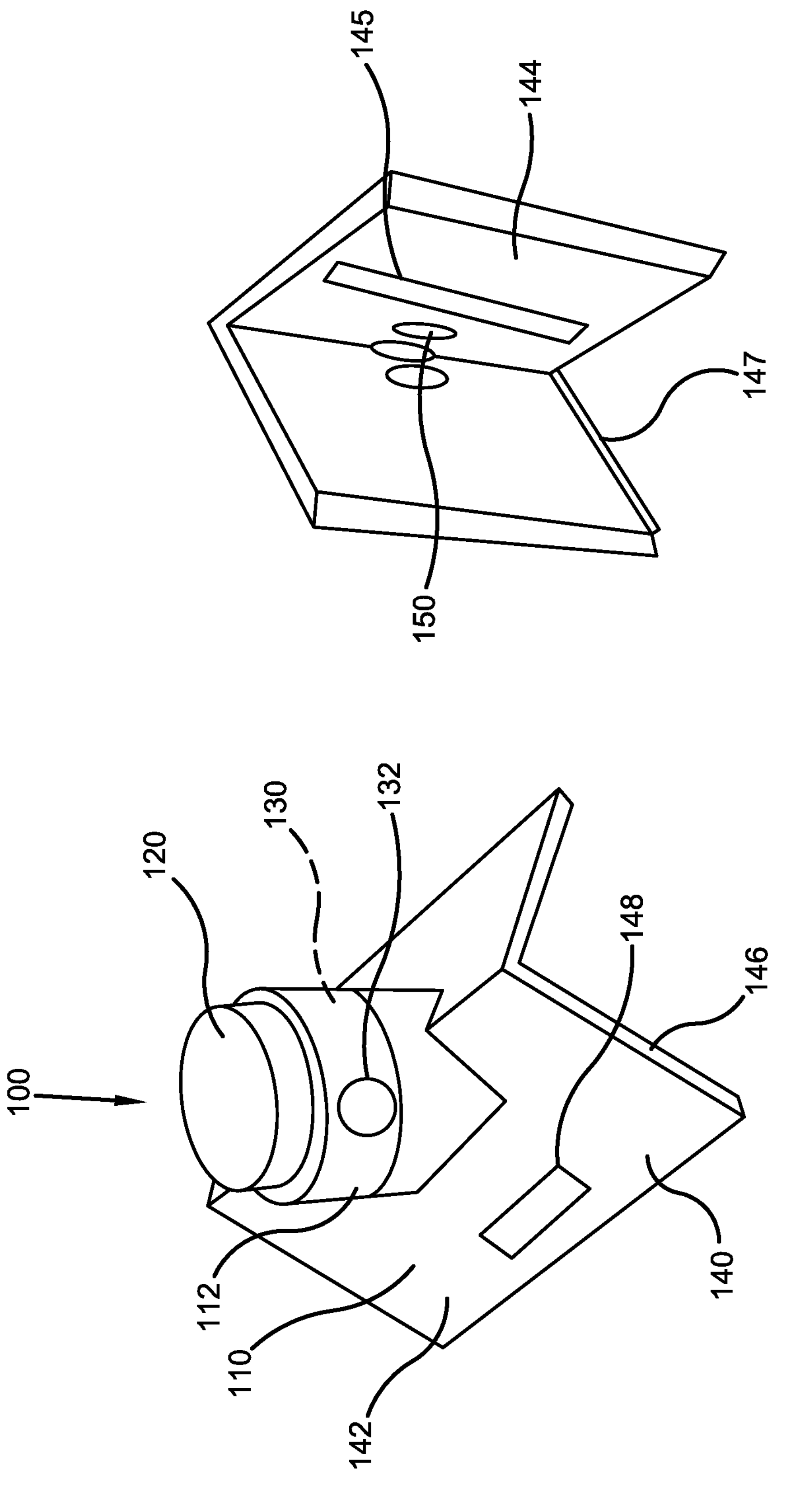
FIG. 1 illustrates a perspective view of one potential embodiment of a surface finish applicator of the present invention having a sharp edge in accordance with the disclosed specification.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a finishing material applicator tool that can fix dented and scuffed walls or apply a texture or other finishing coating to a surface with minimal effort. There exists a long-felt need in the art for a device that provides a way for laymen and workers alike to easily fix damaged walls, apply other finishing materials, or create textures or topographies on a surface. There exists a long-felt need in the art for a material or spackle application device that eliminates the need for multiple tools to fix dents and scuffs in the corners and other areas of walls, or to create different finishing textures. Further, there exists a long-felt need in the art for a surface finishing application device that eliminates the need for experience or skill to fix damaged wall corners or other areas and to create different finishes. There also exists a long-felt need in the art for a material or spackle application device that can fix both rounded and angled walls.

The present invention, in one exemplary embodiment, is comprised of a surface finishing material applicator. The device has a housing, with at least one push tab or plunger like element, at least one interior space forming a chamber, reservoir, or cavity, at least one cap or closure, and at least one grip or handle area. The body and the angled member are in fluid communication via at least one continuous opening. The interior space further houses the finishing or repair material such as spackle, and the push tab or plunger further forces the spackle or finishing material through the interior space and out of the continuous openings. The device further includes at least one an angled member or panel and preferably two panels with each panel having a top edge, bottom edge, and side edges and at least one continuous opening. The panels are connected to one another along a central point connector and may be moveable with respect to one another. In one embodiment, the edges of the angled member and constructed in a 90-degree angle and are flush with sharp wall corners. In another embodiment, the edges of the angled member are rounded in that they are flush with rounded wall corners. In a further embodiment, the panels or angled members may be angled in a range from 1 degree to 179 degrees and preferably 30 degrees to 150 degrees.

Referring initially to the drawings, FIG. 1 illustrates a perspective view of one potential embodiment of a spackle application device 100 with a sharp edge 146 of the present invention in accordance with the disclosed specification. The device 100 is comprised of a housing 110, with at least one push top or plunger like element 120, and at least one interior space 130 forming a chamber, cavity, or reservoir to hold finishing or other materials. The tool 100 may have at least one angled member 140 and at least one continuous opening 150.

The housing 110 may further be manufactured from any material known in the art such as, but not limited to: metal, plastic, wood, rubber, etc. In the preferred embodiment, the housing 110 is manufactured from a rigid plastic material such as, but not limited to: acrylic, polycarbonate, polyethylene, thermoplastic, acrylonitrile butadiene styrene, low-density polyethylene, medium density polyethylene, high-density polyethylene, polyethylene terephthalate, polyvinyl chloride, polystyrene, polylactic acid, acetal, nylon, fiberglass, recycled plastic, biodegradable plastic, and combinations thereof. In the preferred embodiment, the housing 110 may be in a cylindrical shape. In differing embodiments, the housing 110 may be any shape such as, but not limited to: circular, ovular, square, rectangular, triangular, and combinations thereof. The housing cavity, chamber, or reservoir 110 is further positioned on the top surface 142 of the angled member 140.

The housing 110 is further comprised of at least one grip area or handle 112. The grip area or handle 112 located on the housing 110 may be any grip area such as, but not limited to, a textured area, or a contoured area to fit to the user's hand. The housing 110 further is comprised of an interior space forming a cavity, chamber, or reservoir 130 that houses the spackle or other material. The interior space 130 has at least one cap or closure 132. The cap or closure 132 provides a user with the means to fill the interior space 130 with the spackle or other finishing material. The cap or closure 132 may be any cap or closure known in the art such as, but not limited to, snap cap or threaded cap. The housing 110 includes a push top or plunger 120 positioned on the top of the housing 110 and moves within the housing. The push top or plunger 120 allows a user to push down on the push top 120 pushing the spackle or other material through the interior space 130 and through the continuous openings 150 in the angled member or plate. The push top or plunger 120 may be any shape or orientation known in the art. In one embodiment, the push top or plunger 120 is manufactured from a rubber material that allows the user to press the push top or plunger 120 into the interior space or cavity 130, thus pushing the spackle or other material through the device 100. In another embodiment, the push top or plunger 120 is made from a rigid plastic that slides down when it is pushed.

The device 100 further includes at least one angled member 140, having a top surface 142, a bottom surface 144, at least one edge 146, and at least one continuous opening 150. The angled member or plate may be manufactured from any material known in the art such as, but not limited to: metal, plastic, wood, etc. In one embodiment, the angled member 140 may be manufactured from a metal material such as, but not limited to: brass, copper, aluminum, stainless steel, etc. In another embodiment, the angled member 140 may be manufactured from a rigid plastic material such as, but not limited to: acrylic, polycarbonate, polyethylene, thermoplastic, acrylonitrile butadiene styrene, low-density polyethylene, medium-density polyethylene, high-density polyethylene, polyethylene terephthalate, polyvinyl chloride, polystyrene, polylactic acid, acetal, nylon, fiberglass, recycled plastic, biodegradable plastic, and combinations thereof. In one embodiment, the angled member's 140 edges 142 are sharp in that the angled member 140 is angled at a 90-degree angle to be flush with the edges of standard walls 10. In differing a embodiment, edges 146 may be any shape that allows a user to accommodate the different edges of walls 10. The angled member or plate 140 includes at least one continuous opening 150 positioned on the bottom surface 144 and that is preferably centrally disposed of the plate or angled member and near a mid or connection point. The housing 110 and the angled member 140 are further in fluid communication and allow the spackle or other material to be applied to the damaged wall 10 through the continuous opening 150. The material that may be held in the housing may include spackle, caulk, adhesives, sealants, paint, joint compound, finishing, texturing materials or various combinations thereof.

The device 100 may further include a leveling member 148 positioned on the angled member 140. The leveling member 148 allows a user to know that the device 100 is flush against the wall 10 and promotes uniform material application. There are a plurality of levels that may be used such as, but not limited to: carpenter level, bubble level, line level, torpedo level, pocket level, bull's eye level, post level, angle level, cross-check level, mason level, water level, spirit level, etc. The tool or applicator 100 may also have one or more guides 145 which may be used to create a uniform thickness of material being applied to the surface. One or more edges may be provided with a squeegee 147 to prevent excess material from dripping on the floor or area surrounding the application spot.

Figure 2:
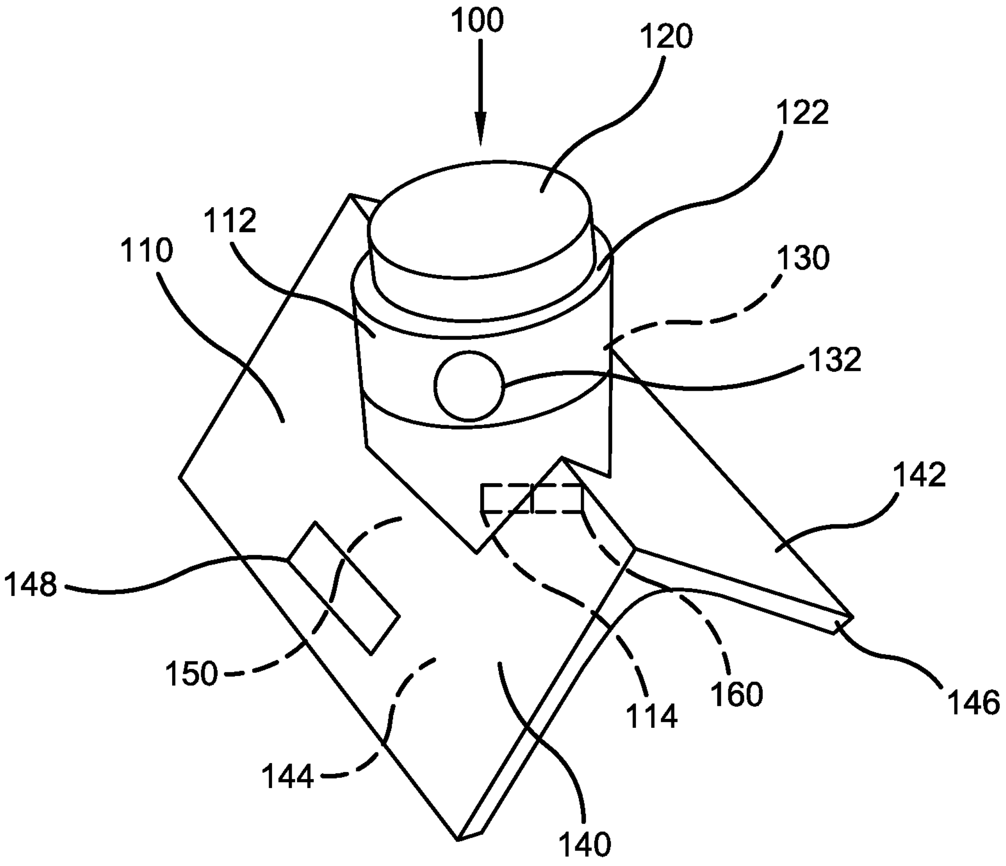
FIG. 2 illustrates a perspective view of one potential embodiment of a surface finish applicator of the present invention having a rounded edge in accordance with the disclosed specification.

FIG. 2 illustrates a perspective view of one potential embodiment of a spackle or finishing material application device 100 with a rounded edge 146 of the present invention in accordance with the disclosed specification. In one embodiment, the edge 146 of the angled member 140 is rounded. This rounded edge 146 allows for the device 100 to be used on wall corners 10 that are rounded instead of sharp. This allows the spackle or other finishing material application device 100 to be used on a plurality of types of wall edges. In one embodiment, the size of the continuous openings 150 may be adjusted. This allows a user to choose the amount of spackle or other material that moves through the opening 150 and onto the wall or surface 10. In one embodiment, the device 100 may have one or more dials 122 positioned on the housing 110. The user can change how wide or change the diameter of the continuous opening 150 by twisting the dial 122. (i.e., turning the dial 122 to the left, would close the continuous openings 150 limiting the amount of spackle or material applied, while moving the dial 122 to the right would make the continuous openings 150 wider, applying more spackle or material.) The dial 122 may be any dial known in the art.

In one embodiment, the angled member or panel 140 is fixed to the housing 110. In another embodiment, the angled members, panels or first and second portions 140, are interchangeable with the housing 110. In the interchangeable embodiment, the angled member 140 may be attached to the housing 110 via at least one fastener 160. The fasteners 160 allow a user to be able to change the angled member 140 to fit any corner of any wall 10 (i.e., if one corner is sharp, has a different angle, and another surface is rounded, the user can change the angled member 140 to do both walls 10 without purchasing a whole new device 100). The fasteners 160 located on the angled member 140 attach to the reciprocating fasteners 114 positioned on the housing 110 for easy customization. The fasteners 160, 114 may be any fasteners such as, but not limited to: magnetic, adhesive, hook and loop, snap button, tongue and groove, etc. Allowing the housing to be removed also permits an individual to insert other housings which may contain other type of material, for example the individual may apply spackle initially and then paint in order to finish a wall.

Figure 3:
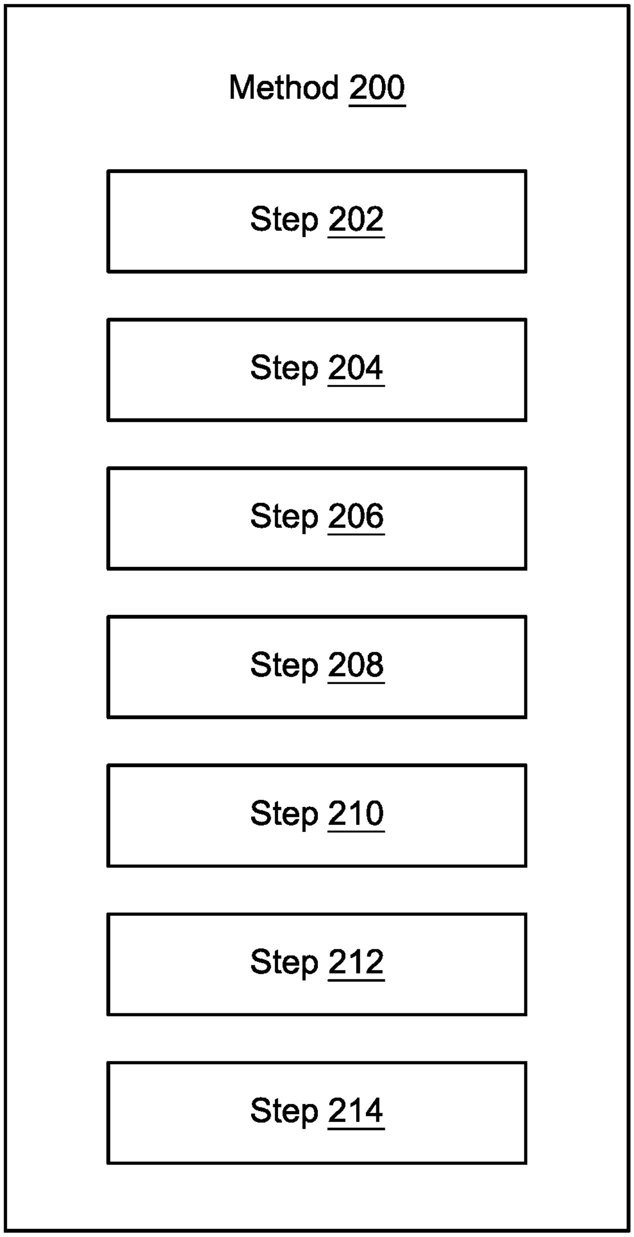
FIG. 3 illustrates a flowchart of one potential method of using one potential embodiment of the surface finish applicator of the present invention in accordance with the disclosed specification.

FIG. 3 illustrates a flowchart of one potential method 200 of using one potential embodiment of the spackle or other material application device 100 of the present invention in accordance with the disclosed specification. First, the user opens the cap or closure 132 positioned on the housing 110 [Step 202]. Then, the user fills the interior space or cavity 130 with the spackle or other material [Step 204]. The user then places the bottom surface 144 of the angled member against the wall 10 that the user wishes to fix, finish, or texture [Step 206]. Then the user lines the device up using the leveling member 148 positioned on the angled member 140 [Step 208]. Next, the user pushes the push tab or plunger 120 positioned on the housing 110 to apply the spackle or other material [Step 210]. Then, while simultaneously pushing down on the push tab or plunger 120, the user drags the device 100 down or up along the wall 10 [Step 212]. Finally, the user can expel the excess spackle or material from the device 100 and clean it for future use [Step 214].

Figure 4:
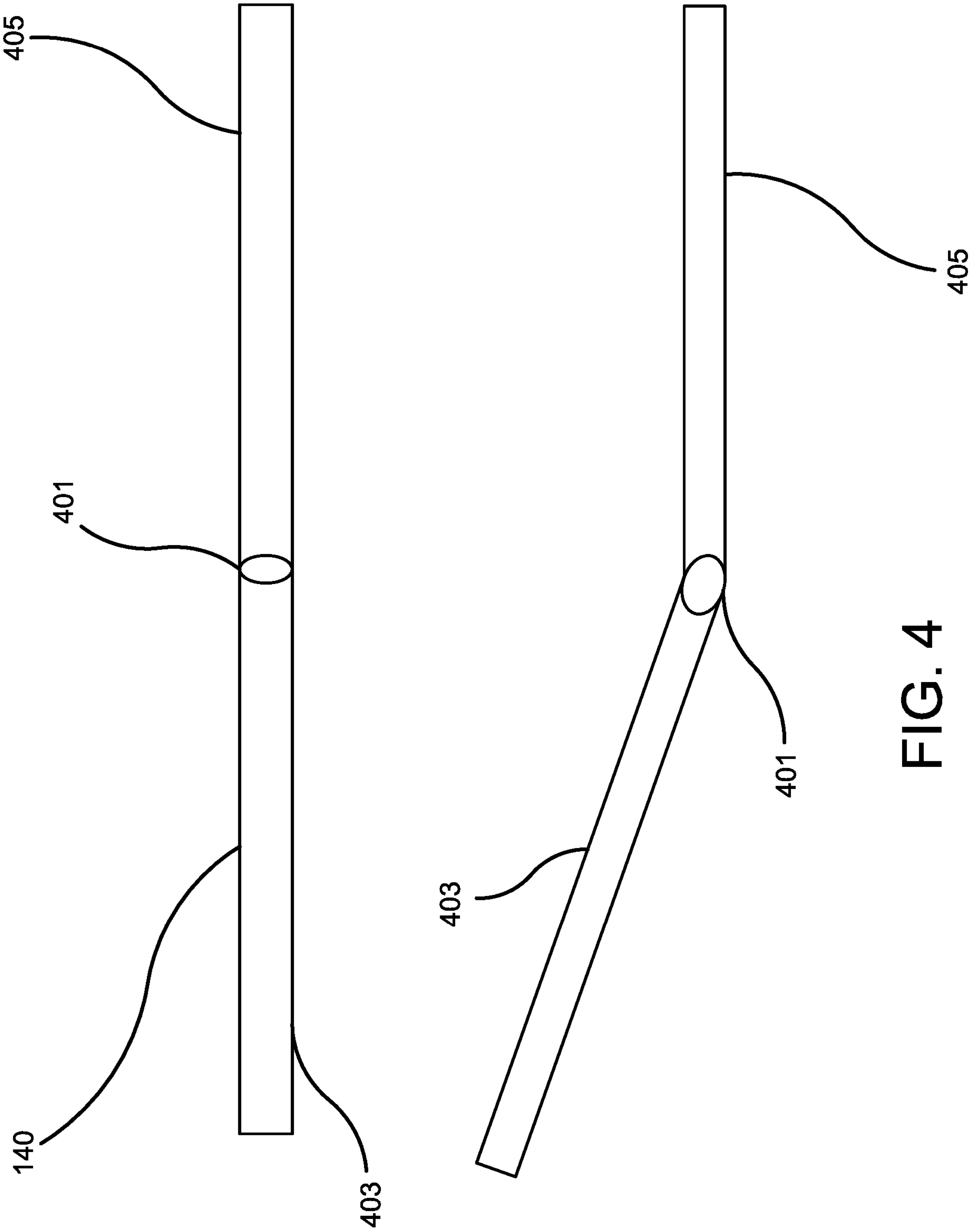
FIG. 4 illustrates one potential embodiment of the surface finish applicator of the present invention in different angled positions.

FIG. 4 provides an illustration of the angled members 140 with first and second portion 403, 405, respectively, connected together at a central point 401 which allows the first and second portions 403, 405 to be moved with respect to one another. The first and second portions may have a range of angles from 1 degree to 179 degrees and more preferably from 30 degrees to 150 degrees. In addition, the user may only need to move one of the first and second portions of the angled member to achieve the desired conformity with the surface being finished.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "application device", "tool", "applicator" and "device" are interchangeable and refer to the surface finishing application device 100 of the present invention.

Notwithstanding the foregoing, the surface finishing application device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the surface finishing application device 100 as shown in the FIGS. Are for illustrative purposes only, and that many other sizes and shapes of the surface finishing or spackle application device 100 are well within the scope of the present disclosure. Although the dimensions of the spackle application device 100 are important design parameters for user convenience, the surface finishing application device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A surface finishing tool comprising:

an angled member having a first panel, a second panel, a top surface, a bottom surface, a top edge, a bottom edge and a pair of side edges;

a housing disposed on the angled member, wherein the housing is comprised of an interior space forming a cavity; and a plunger provided in the interior space and movable within the interior space to displace a material; and wherein the interior space is accessible via a cap; and further wherein the angled member has an adjustable opening in the bottom surface and a dial configured to adjust a diameter of the continuous opening.

2. The surface finishing tool as recited in claim 1, wherein the housing is positioned centrally on the angled member.

3. The surface finishing tool as recited in claim 1, wherein the housing further comprises a grip area or a handle.

4. The surface finishing tool as recited in claim 1, wherein the angled member further comprises a leveling aid.

5. The surface finishing tool as recited in claim 1, wherein the angled member further comprises a guide and a squeegee that is positioned along the bottom edge.

6. The surface finishing tool as recited in claim 1, wherein the material is one of a spackle, a caulk, a sealant, a paint, a joint compound, an adhesive, a finishing or texturing material or a combination thereof.

7. A spackle applicator comprising:

a plate comprising a first portion and a second portion that are connected at a center point;

a housing positioned on the plate and comprising an interior space forming a cavity for holding a spackle;

a push top disposed within the housing and for moving in the interior space and displacing the spackle;

at least one opening in the plate that is in fluid communication with the interior space; and a dial configured to adjust a diameter of the continuous opening, wherein the interior space is accessible via a cap.

8. The spackle applicator as recited in claim 7, wherein the plate is comprised of a top surface, a bottom surface, a top edge, a bottom edge and a pair of side edges, and further wherein the housing is provided on the top surface and the at least one opening is provided on the bottom surface.

9. The spackle applicator as recited in claim 7, wherein the first and second portions are interchangeable.

10. The spackle applicator as recited in claim 7, wherein the plate further comprises a leveling aid.

11. A tool for applying a finishing material to a wall, the tool comprising:

an angled member comprising a top surface, a bottom surface, a top edge, a bottom edge, a pair of side edges, a first portion and a second portion, wherein each of the first and second portions are repositionable with respect to one another;

a housing mounted on the top surface of the angled member, wherein the housing comprises an interior space forming a chamber for holding a finishing material; and at least one opening in the angled member that is in fluid communication with the interior space of the housing, wherein the at least one opening is adjustable in diameter via a dial, wherein the interior space is accessible via a cap.

* * * * *